US012598105B2

(12) United States Patent
Kazmierski

(10) Patent No.: US 12,598,105 B2
(45) Date of Patent: Apr. 7, 2026

(54) SOFTWARE-DEFINED DEVICE TRACKING IN NETWORK FABRICS

(71) Applicant: Cisco Technology, Inc., San Jose, CA (US)

(72) Inventor: Mariusz Kazmierski, Malopolskie (PL)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 18/680,268

(22) Filed: May 31, 2024

(65) Prior Publication Data

US 2024/0323078 A1     Sep. 26, 2024

Related U.S. Application Data

(62) Division of application No. 18/076,695, filed on Dec. 7, 2022, now Pat. No. 12,034,592.

(51) Int. Cl.
H04L 41/0806 (2022.01)
H04L 41/342 (2022.01)
H04L 43/12 (2022.01)

(52) U.S. Cl.
CPC ........ H04L 41/0806 (2013.01); H04L 41/342 (2022.05); H04L 43/12 (2013.01)

(58) Field of Classification Search
CPC ..... H04L 43/10; H04L 41/0806; H04L 43/12; H04L 41/342; H04L 41/0894
See application file for complete search history.

(56) References Cited

U.S. PATENT DOCUMENTS

| | | | |
|---|---|---|---|
| 8,451,745 B2 * | 5/2013 | Weng ................. | H04L 41/5003 |
| | | | 709/224 |
| 9,100,274 B1 | 8/2015 | Ghosh | |
| 11,522,755 B1 | 12/2022 | Warkhedi | |
| 12,028,250 B2 * | 7/2024 | Jain ........................ | H04L 45/74 |
| 12,034,592 B2 | 7/2024 | Kazmierski | |
| 2009/0232139 A1 | 9/2009 | Kelley | |
| 2013/0016718 A1 | 1/2013 | Johnsen | |

(Continued)

OTHER PUBLICATIONS

Kataoka Kotaro et al: "Trust list: Internet-wide and distributed traffic management using blockchain and SDN", 2018 IEEE 4th World Forum on Internet Ofthings (WF-IOT), IEEE,Feb. 5, 2018 (Feb. 5, 2018), pp. 296-301, XP033338377,DOI: 10.1109/WF-IOT. 2018.8355139[retrieved on May 4, 2018]* chapter III.B *figure 3, 6 pages.

(Continued)

*Primary Examiner* — Tonia L Dollinger
*Assistant Examiner* — Linh T. Nguyen
(74) *Attorney, Agent, or Firm* — Lee & Hayes, P.C.

(57) ABSTRACT

Techniques for leveraging a software defined tracking architecture for endpoint probing are described. An orchestrator of a network fabric receives probing rules associated with a particular endpoint type. The orchestrator receives a notification that an event occurred with respect to an and point connected to the fabric edge device, the notification indicates that the endpoint is of the particular endpoint type. Based at least in part on the endpoint being of the particular endpoint type, the orchestrator transmits instructions, based at least in part on the probing rules, regarding how to probe the endpoint, to the fabric edge device.

20 Claims, 9 Drawing Sheets

800 ⇥

RECEIVE, AT AN ORCHESTRATOR OF A NETWORK FABRIC, PROBING RULES ASSOCIATED WITH A PARTICULAR ENDPOINT TYPE
802

RECEIVE, AT THE ORCHESTRATOR AND FROM A FABRIC EDGE DEVICE, A NOTIFICATION THAT AN EVENT OCCURRED WITH RESPECT TO AN ENDPOINT CONNECTED TO THE FABRIC EDGE DEVICE, THE NOTIFICATION INDICATING THAT THE ENDPOINT IS OF THE PARTICULAR ENDPOINT TYPE
804

BASED AT LEAST IN PART ON THE ENDPOINT BEING OF THE PARTICULAR ENDPOINT TYPE, TRANSMITTING, FROM THE ORCHESTRATOR AND TO THE FABRIC EDGE DEVICE, INSTRUCTIONS, BASED AT LEAST IN PART ON THE PROBING RULES, REGARDING HOW TO PROBE THE ENDPOINT
806

(56) References Cited

U.S. PATENT DOCUMENTS

| | | | |
|---|---|---|---|
| 2013/0311675 A1* | 11/2013 | Kancherla | H04L 69/22 |
| | | | 709/244 |
| 2017/0078241 A1 | 3/2017 | Zhang | |
| 2017/0149614 A1 | 5/2017 | Zheng | |
| 2017/0214719 A1 | 7/2017 | Mohan et al. | |
| 2017/0264496 A1* | 9/2017 | Ao | H04L 49/70 |
| 2018/0063072 A1 | 3/2018 | Wackerly et al. | |
| 2018/0077642 A1* | 3/2018 | Mandiganal | H04L 12/2803 |
| 2018/0139104 A1 | 5/2018 | Seddigh | |
| 2018/0324097 A1* | 11/2018 | Liu | H04L 47/125 |
| 2019/0306024 A1* | 10/2019 | Petria | H04W 4/50 |
| 2019/0320494 A1* | 10/2019 | Jayawardene | H04W 48/18 |
| 2019/0379734 A1 | 12/2019 | Zavesky | |
| 2019/0386891 A1* | 12/2019 | Chitalia | G06F 3/048 |
| 2020/0106664 A1 | 4/2020 | Kapur | |
| 2020/0162517 A1 | 5/2020 | Wong et al. | |
| 2020/0186383 A1* | 6/2020 | Sebastian | H04L 67/565 |
| 2020/0186431 A1 | 6/2020 | Chamarajnager | |
| 2020/0403821 A1 | 12/2020 | Dev | |
| 2021/0194935 A1* | 6/2021 | Chamarajnagar | H04L 65/103 |
| 2021/0218594 A1 | 7/2021 | Sundararajan et al. | |
| 2021/0250303 A1* | 8/2021 | Jiang | H04L 45/42 |
| 2021/0288939 A1 | 9/2021 | Whittle et al. | |
| 2021/0314183 A1* | 10/2021 | Ward | H04L 65/1016 |
| 2021/0344591 A1 | 11/2021 | Kondalam | |
| 2022/0006738 A1 | 1/2022 | Jain | |
| 2022/0141254 A1 | 5/2022 | Oswal et al. | |
| 2022/0247677 A1 | 8/2022 | Baruah et al. | |
| 2022/0352150 A1 | 11/2022 | Chiang | |
| 2022/0407836 A1 | 12/2022 | Narayanan | |
| 2023/0010247 A1 | 1/2023 | Kumar | |
| 2023/0179439 A1 | 6/2023 | Thubert | |
| 2023/0370453 A1 | 11/2023 | Kobo | |
| 2023/0379270 A1 | 11/2023 | Hooda | |

OTHER PUBLICATIONS

O'Brien; "Cisco SD-WAN: WAN Edge Onboarding", Apr. 17, 2020; My CIEE Journey; 2020, pp. 1-7.

Office Action for U.S. Appl. No. 18/076,695, mailed on Jan. 8, 2024, Kazmierski, "Software-Defined Device Tracking in Network Fabrics", 9 pages.

Jordi Paillisse et al: "SD-Access: Practical Experiences in Designing andDeploying Software Defined Enterprise Networks", arxiv.org, Cornell University Library, 2010LIN Library Cornell University Ithaca, NY 14853, Feb. 19, 2021 (Feb. 19, 2021), XP081882817,* chapter 3.3 *figure 3, 14 pages.

PCT Invitation to Pay Additional Fees mailed Mar. 25, 2024 for PCT Application No. PCT/US2023/082841, 34 pages.

Search Report and Written Opinion for International Application No. PCT/US2023/082841, Dated May 16, 2024, 21 pages.

* cited by examiner

Figure 6:
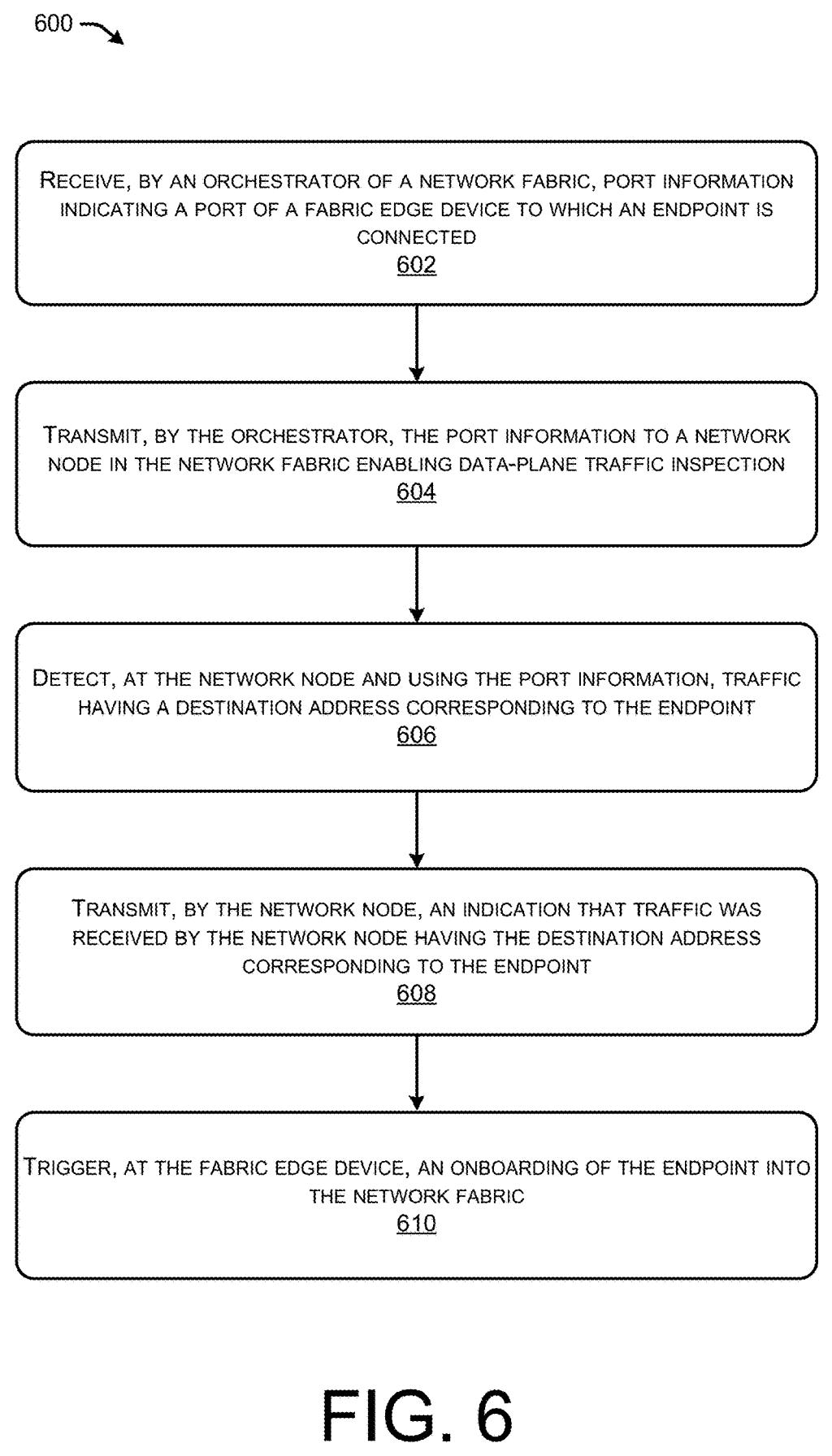

600 ⟍

RECEIVE, BY AN ORCHESTRATOR OF A NETWORK FABRIC, PORT INFORMATION INDICATING A PORT OF A FABRIC EDGE DEVICE TO WHICH AN ENDPOINT IS CONNECTED
602

TRANSMIT, BY THE ORCHESTRATOR, THE PORT INFORMATION TO A NETWORK NODE IN THE NETWORK FABRIC ENABLING DATA-PLANE TRAFFIC INSPECTION
604

DETECT, AT THE NETWORK NODE AND USING THE PORT INFORMATION, TRAFFIC HAVING A DESTINATION ADDRESS CORRESPONDING TO THE ENDPOINT
606

TRANSMIT, BY THE NETWORK NODE, AN INDICATION THAT TRAFFIC WAS RECEIVED BY THE NETWORK NODE HAVING THE DESTINATION ADDRESS CORRESPONDING TO THE ENDPOINT
608

TRIGGER, AT THE FABRIC EDGE DEVICE, AN ONBOARDING OF THE ENDPOINT INTO THE NETWORK FABRIC
610

Figure 7:
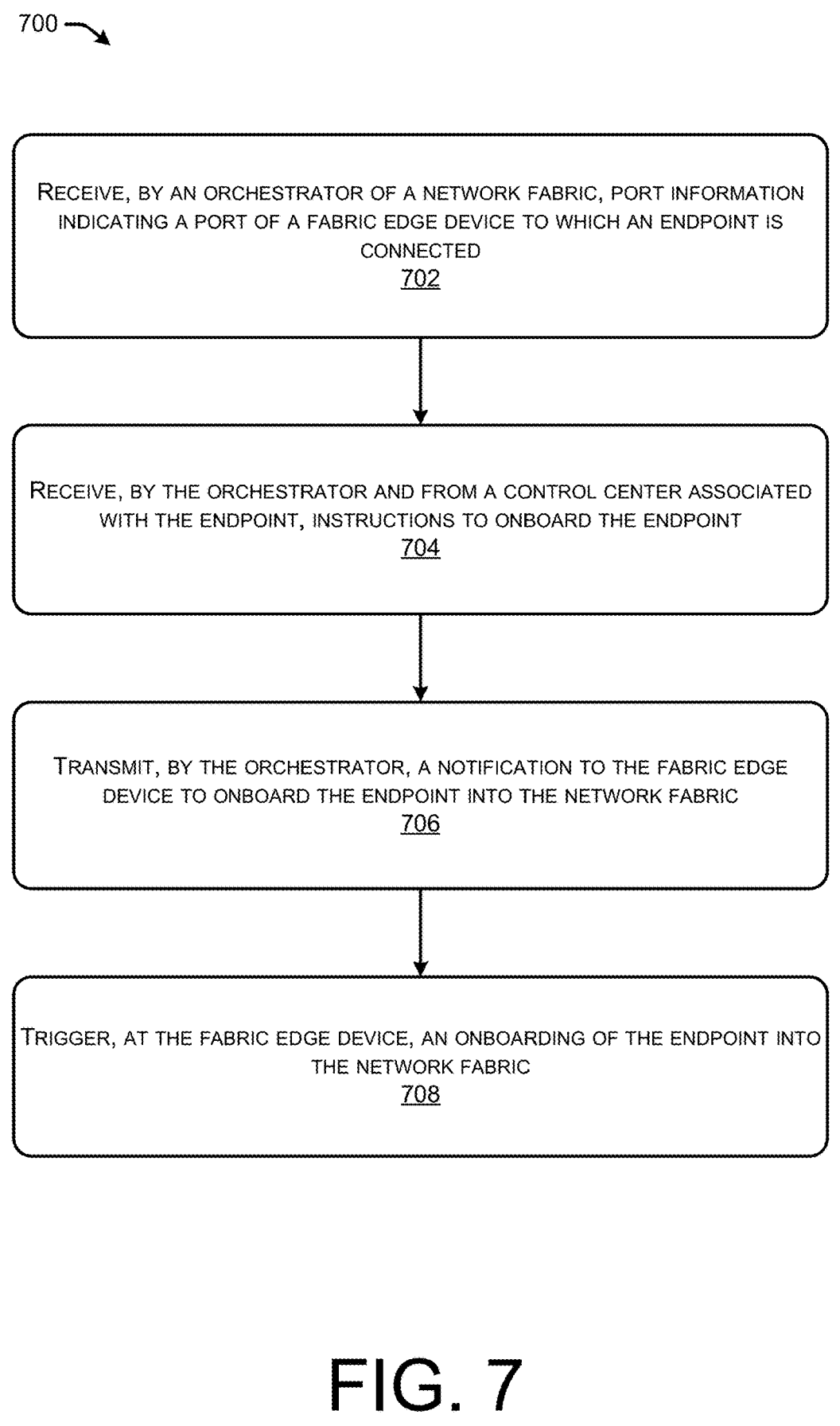

RECEIVE, BY AN ORCHESTRATOR OF A NETWORK FABRIC, PORT INFORMATION INDICATING A PORT OF A FABRIC EDGE DEVICE TO WHICH AN ENDPOINT IS CONNECTED
702

RECEIVE, BY THE ORCHESTRATOR AND FROM A CONTROL CENTER ASSOCIATED WITH THE ENDPOINT, INSTRUCTIONS TO ONBOARD THE ENDPOINT
704

TRANSMIT, BY THE ORCHESTRATOR, A NOTIFICATION TO THE FABRIC EDGE DEVICE TO ONBOARD THE ENDPOINT INTO THE NETWORK FABRIC
706

TRIGGER, AT THE FABRIC EDGE DEVICE, AN ONBOARDING OF THE ENDPOINT INTO THE NETWORK FABRIC
708

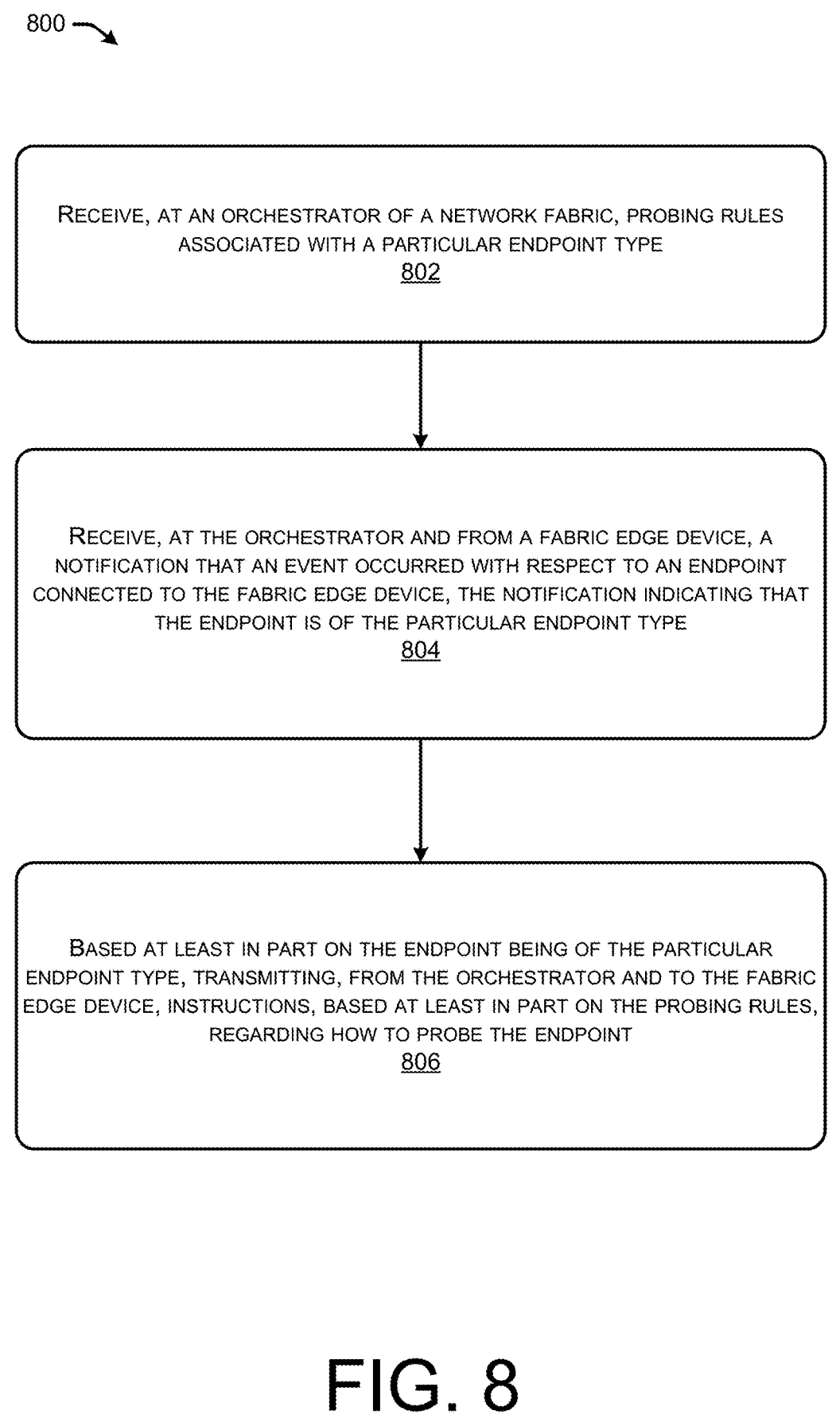

RECEIVE, AT AN ORCHESTRATOR OF A NETWORK FABRIC, PROBING RULES
ASSOCIATED WITH A PARTICULAR ENDPOINT TYPE
802

RECEIVE, AT THE ORCHESTRATOR AND FROM A FABRIC EDGE DEVICE, A
NOTIFICATION THAT AN EVENT OCCURRED WITH RESPECT TO AN ENDPOINT
CONNECTED TO THE FABRIC EDGE DEVICE, THE NOTIFICATION INDICATING THAT
THE ENDPOINT IS OF THE PARTICULAR ENDPOINT TYPE
804

BASED AT LEAST IN PART ON THE ENDPOINT BEING OF THE PARTICULAR
ENDPOINT TYPE, TRANSMITTING, FROM THE ORCHESTRATOR AND TO THE FABRIC
EDGE DEVICE, INSTRUCTIONS, BASED AT LEAST IN PART ON THE PROBING RULES,
REGARDING HOW TO PROBE THE ENDPOINT
806

FIG. 8

SOFTWARE-DEFINED DEVICE TRACKING IN NETWORK FABRICS

RELATED APPLICATIONS

This application claims priority to U.S. patent application Ser. No. 18/076,695, filed on Dec. 7, 2022; the entire contents of which are incorporated herein by reference.

TECHNICAL FIELD

The present disclosure relates generally to device tracking in network fabrics. Specifically, a software-defined centralized tracking solution that provides for endpoint onboarding and endpoint probing for IoT or other endpoint devices that may behave in a non-standard fashion is described.

BACKGROUND

IP Device Tracking (IPDT) is a critical network layer, or Layer-3, ISO/OSI feature which is responsible for tracking endpoints in a network. Used to track the presence, location, and movement of endpoints in a network, IPDT snoops traffic received by a network device, extracts device identity (e.g., MAC and IP address), and stores them in a binding table. Many features, such as IEEE 802.1X, web authentication, NetFlow, Cisco TrustSec and LISP among others, depend on the accuracy of this information to operate properly.

Current implementations of IPDT are mainly based on local packet gleaning, by punting packets (e.g., IPv4 ARP, IPv6 ND, DHCP, etc.) on directly connected network device CPUs for software processing and creating the IPDT state, and local probing, where an IPDT session is maintained by sending regular ARP packets to the endpoint and refreshing the IPDT entry.

Typically, IPDT is a localized framework, meaning a specific network device to which an endpoint is connected, is responsible for the endpoint being onboarded into the network, as well as locally probing the endpoint device. This approach is the same irrespective of a type of endpoint connected to the network. All endpoints are treated equally with the assumption that they all behave in a typical or standardized way. This approach works well with standardized endpoints, such as laptops, cellular phone, desktop computers, and the like, as these types of endpoints use known protocols and behave in a standard fashion.

In addition, the world is becoming more and more interconnected and data-driven, with enterprise organizations increasingly embracing the Internet of Thing (IoT) and IoT capable devices. Thus, the need for Operational Technology (OT) is ever increasing in order to monitor, control, and manage IoT devices. Businesses that engage in activities such as manufacturing, utilities, transportation, among many others rely heavily on OT to manage ever expanding networks of IoT capable devices and equipment. Manufacturing robotic arms, industrial controls systems (ICS), supervisory control and data acquisition (SCADA) systems, programmable logic controls (PLCs), and computer numerical control (CNC) are all examples of smart, interconnected, devices that are managed by OT. Just as tracking the presence, location, movement, and state of endpoints in an IT network is critical, the same is true for an OT network of IoT devises.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for onboarding an endpoint in a software defined network triggered by network traffic.

FIG. 7 illustrates a flow diagram of an example method for onboarding an endpoint in a software defined network triggered by an external control center.

FIG. 8 illustrates a flow diagram of an example method for probing an endpoint in a software defined network.

DESCRIPTION OF EXAMPLE EMBODIMENTS

Overview

Figure 1:
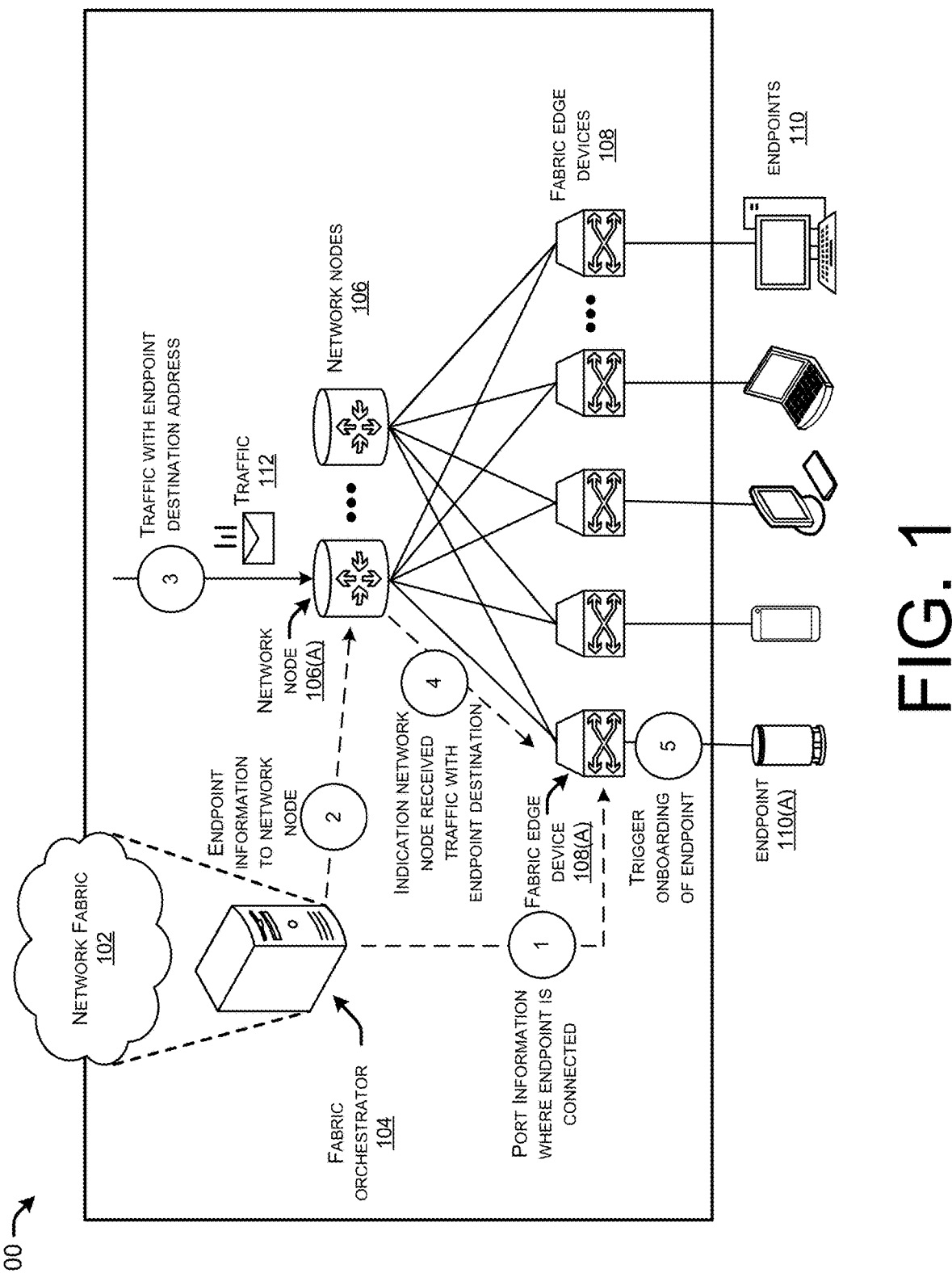
FIG. 1 illustrate a system-architecture diagram of an example environment for implementing at least some of the various technologies disclosed herein. The environment includes a software defined network where endpoint onboarding is triggered by an indication sent from a network node due to network traffic.

This disclosure describes a method for leveraging endpoint onboarding and endpoint probing in a software defined network. A first method includes receiving, by an orchestrator of a network fabric, port information indicating a port of a fabric edge device to which an endpoint is connected. Further, the method includes transmitting, by the orchestrator, the port information to a network node in the network fabric enabling data-plane traffic inspection. The method may also include detecting, at the network node and using the port information, traffic having a destination address corresponding to the endpoint. Additionally, the method may include transmitting, by the network node, an indication that traffic was received by the network node having the destination address corresponding to the endpoint. Finally, the method may include triggering, at the fabric edge device, an onboarding of the endpoint into the network fabric.

This disclosure describes an additional method for onboarding an endpoint, the method includes receiving, by an orchestrator of a network fabric, port information indicating a port of a fabric edge device to which an endpoint is connected. The method may also include receiving, by the orchestrator and from a control center associated with the endpoint, instructions to onboard the endpoint. The method may also include transmitting, by the orchestrator, a notification to the fabric edge device to onboard the endpoint into the network fabric. Finally, the method may include triggering, at the fabric edge device, an onboarding of the endpoint into the network fabric.

This disclosure describes a method for probing an endpoint, the method includes receiving, at an orchestrator, probing rules associated with a particular endpoint type. The method may also include receiving, at the orchestrator and from a fabric edge device, a notification that an event occurred with respect to an endpoint connected to the fabric edge device, the notification indicating that the endpoint is of the particular endpoint type. Finally, based at least in part on the endpoint being of the particular endpoint type, the method includes transmitting, from the orchestrator and to the fabric edge device, instructions, based at least in part on the probing rules, regarding how to probe the endpoint.

Example Embodiments

As described above, currently, IPDT framework functions the same way irrespective of a type of endpoint that may be connected to the network and treats all endpoints equally with the assumption that they all behave in a typical or standardized way. However, in the real world, taking such a uniform approach to all possible endpoints has proven to not always work properly and leads to using additional fabric constructs (e.g., L2 flooding) just to overcome current IPDT limitations. Specifically, with the integration of a IoT/OT network having IoT endpoints that need to be first activated and then maintained and kept alive in the fabric, there are a number of challenges which make current IPDT usage cumbersome and problematic in real world implementations. This is because IoT/OT endpoints (e.g., production robots, measuring instruments, certain PLCs, etc.) use legacy, constrained, or non-standard IP stack implementation that breaks existing IPDT functionality. For example, IoT endpoints may not reply to probes, may use non-standard timers that do not work with timers in the network, may go into sleep mode and need to be woken up, etc. Additionally, silent endpoints, which do not generate traffic, or do so very sporadically or only at the time of onboarding, introduce challenges with initial endpoint registration in IPDT and tracking. Another example of challenges faced with IPDT are sleeping or disappearing endpoints (e.g., PLCs and other OT network elements) that can suddenly stop replying to probes as they move to sleep mode and require packets similar to Wake-on-LAN (WOL) that are usually broadcasted in the whole network causing non-optimal network functioning (e.g., L2 flooding and the usage of broadcast packets). Additionally, current IPDT logic does not have any scalable way to apply different policies dynamically based on endpoint type, to better adjust to non-standard endpoints, and to onboard and probe non-standard or proprietary endpoints.

This disclosure describes techniques for leveraging a distributed Software Defined Tracking (SDT) architecture that enhances current IPDT behavior and that adapts to a plethora of behaviors from various endpoints, whether standard or proprietary, particularly endpoints related to an IoT/OT environment. The distributed SDT provides for enhanced endpoint onboarding logic that is no longer a network function implemented only on a directly connected network device but is extended to the whole fabric by a fabric orchestrator or controller. This approach provides for data-plane traffic received on any network node in the fabric (e.g., a fabric border device, fabric edge device, or even a device outside of the network fabric) to trigger onboarding activity for a specific endpoint connected to a specific fabric edge device. As an example, such functionality is useful in the real-life scenario where IoT water pumps/Building Management System (BMS) need to be connected to the edge of Software Defined Access/Ethernet Virtually Private Network (SDA/EVPN). Additionally, such functionality can be used to easily onboard or awaken an endpoint simply by inspecting traffic received on the border node (e.g., WOL, DECnet, BMS traffic) and triggering remote onboarding or probing instructions at a specific fabric edge device. This approach can prevent implementing other workarounds such as L2 flooding and the like.

In some examples of techniques that leverage distributed SDT architecture that enhances current IPDT behavior, an event-driven approach is used to trigger an onboarding of an endpoint device. In a first implementation, notification logic may leverage existing protocols in a fabric such as Locator ID Separation Protocol (LISP) or Border Gateway Protocol (BGP) to signal specific data-plane triggers as an event to the edge device. Alternately or in addition, any other appropriate known or new protocol may be used. Initially, an administrator may identify a port where a specific endpoint is connected. This information may include (but is not limited to) the fabric edge interface, MAC, and IP, and is provided to a fabric orchestrator (e.g., DNA center). The orchestrator shares the information about the endpoint with other network nodes in the fabric which enables data-plane traffic inspection. When an event occurs, such as a network node receiving traffic that uniquely identifies the endpoint (e.g., MAC in WOL packet), the event is forwarded to the proper fabric edge device via existing protocols (e.g., LISP or BGP) to trigger an endpoint onboarding process.

Alternately, in a second example implementation, an administrator may identify a port where a specific endpoint in connected and this information is provided to a network orchestrator, similar to the previous example implementation. Once again, information about the endpoint is shared with other network nodes in the fabric enabling data-plane traffic inspection. When an event occurs, such as a network node receiving traffic that uniquely identifies the endpoint (e.g., MAC in WOL packet) the event is forwarded to the fabric orchestrator and the fabric orchestrator sends a unicast notification to the respective fabric edge device to onboard the specific endpoint. The fabric edge device then onboards the endpoint into the fabric without a need to enable L2 broadcast/flooding.

In a third example implementation, there may be an external control center responsible for a network of endpoints that are the type of endpoint that is to be onboarded into a network fabric. In this implementation, an administrator identifies a port where a specific endpoint is connected, including fabric edge, interface, MAC, IP, etc. Information is then sent from an external IoT control center to the fabric orchestrator to bring the endpoint onboard, or all endpoints of the endpoint type, for example after maintenance has been completed on the endpoints. The event is then forwarded from the orchestrator to the relevant fabric edge device(s) in order to onboard all relevant endpoints into the network fabric. This third example implementation uses an event-driven approach to react to any events by the fabric orchestrator, for example, a link-up event on the fabric edge device, a specific Cisco Discovery Protocol (CDP) or Link Layer Discovery Protocol (LLDP) packet received on the endpoint facing port, an Application Programming Interface (API) call from a proprietary system that is responsible for managing an IoT network, combined with details known by the fabric orchestrator, or discovery of a Software Defined Application Visibility and Control (SD-AVC) class of the endpoint. This received event will trigger endpoint onboarding on a specific fabric edge device. Notification logic in this case may be implemented between the fabric orchestrator and the fabric edge device and may leverage new or existing protocols (e.g., Secure Shell (SSH), Network Configuration (NETCONF), API push from the orchestrator to the fabric edge).

In the first example implementation, the event is forwarded directly from the network node device to the fabric edge device. In the second example implementation, the event is forwarded from the network node device to the fabric orchestrator and the fabric orchestrator sends a notification to the fabric edge to onboard the endpoint. In the third example implementation, the event is received by the orchestrator from and external IoT control center and forwarded to the relevant fabric edge device(s).

Another advantage of distributed SDT architecture that enhances current IPDT behavior is related to enhanced probing logic for endpoints connected to the network fabric. When implementing a distributed SDT architecture, enhanced probing logic is no longer a generic network function implemented only on a directly connected network device to which an endpoint is connected, but instead, is extended further to take into account specific endpoint characteristics that can adjust probing logic based on the specific endpoint type. For example, for specific types of devices, existing probing logic can be significantly improved so that it can become better adjusted to the specific endpoint device class, thereby reducing potential chances of deregistration events compared to traditional approaches. Note that this approach allows for a smooth transition from the generic logic to a more tailored one. Any possible delays introduced with the changes of the probing policy will not negatively impact the behavior, as by default current approaches can still be used.

In a first enhanced probing implementation, a network administrator specifies optimal probing rules for a given class of endpoints (e.g., BMS to use DECnet packets instead of ARP). An endpoint related event occurs (e.g., link up, CDP/LLDP packet, successful classification of the endpoint on the fabric edge, etc.), the event may occur on the fabric edge, or another network device. Once the event occurs, information about the specific event is passed to the fabric orchestrator. Based on configured probing rules and endpoint classification, the orchestrator sends instructions on how to adjust current probing logic to optimize behavior for the given class of endpoints to the fabric edge device. This may be done via SSH, NETCONF, an API call, or any other appropriate method. When the fabric edge device receives the instructions, the fabric edge initiates optimal probing logic for the given endpoint class (e.g., protocol, timers to be used, etc.) based on the instructions received.

In a second enhanced probing implementation, existing probing logic for a given endpoint class may be leverage by implementing application layer probing. For example, a performance or monitoring system (or any other appropriate application infrastructure) may be used to probe the endpoint or set of endpoints of a particular type. An administrator may decide to disable network layer probing and switch over to application layer probing. Probing between the fabric edge device and the endpoint is disabled and application layer probing is enabled. The fabric orchestrator can monitor application layer probing state (e.g., via API to proprietary system, etc.). When there is a probing state change, information is passed to the fabric edge to change local IPDT state-machine and reflect this state accordingly.

For example, production robots used in manufacturing may use their own proprietary keep-alive and health-check logic. Using enhanced application layer probing the logic can be connected to a SDT system to assure endpoints are not unexpectedly de-registered from the network only because they do not comply to generic network layer probing logic applied on the fabric edge. In a specific scenario, the fabric orchestrator may signal specific events to the fabric edge, steering fabric edge finite state-machine related to the probing logic. For example, if a specific endpoint (e.g., robotic arm) has a proprietary keep-alive logic that connects it with an IoT control center, a monitoring agent may be deployed in a container on the endpoint OS that could mimic keep-alive logic (e.g., by having HTTP probes exchanged between the endpoint and the IoT control center) and be used for endpoint tracking purposes. For example, when a probe goes down, the monitoring system will send an API to the fabric orchestrator which would trigger an event to the fabric edge to unregister the endpoint.

FIG. 1 illustrates an example software defined tracking (SDT) architecture for enhancing IPDT. The environment 100 includes a network fabric 102 with a centralized fabric orchestrator 104, that controls network devices such as network nodes 106 and fabric edge devices 108. Environment 100 also includes multiple endpoints 110 connected to the network fabric 102 at fabric edge devices 108.

For enhanced endpoint onboarding of an endpoint connected to the network fabric, such as endpoint 110(A) connected to network fabric 102 by fabric edge device 108(A), at (1) the fabric orchestrator 104 receives port information regarding where endpoint 110(A) is connected. For example, a network administrator may identify a port number of fabric edge device 108(A) where endpoint 110(A) is connected, and the MAC address, and IP address of the endpoint 110(A).

Once the orchestrator 104 has the information regarding where the endpoint 110(A) is connected to the network fabric 102, at (2) the orchestrator 104 shares this endpoint information with other network nodes 106, such as network node 106(A) in this example, which enables data-plane inspection.

At (3), when the network node 106(A) receives traffic 112 having the destination address of endpoint 110(A), the network node 106(A) sends an indication, at (4), to fabric edge device 108(A) to which the endpoint 110(A) is connected, the indication including that network node 106(A) has received traffic 112 having the destination address of endpoint 110(A).

When fabric edge device 108(A) receives the indication that network node 106(A) has received traffic 112 having a destination address of endpoint 110(A), at (5) an onboarding process for endpoint 110(A) is triggered at fabric edge device 108(A), and the endpoint 110(A) is successfully onboarded into the network fabric 102 without the need to enable L2 broadcast domain/flooding. Thus, the onboarding process for endpoint 110(A) is triggered based on an event, in this example the even of network node 106(A) receiving traffic 112. In addition, the onboarding is accomplished at a network fabric level from the fabric orchestrator 104 instead of in a localized fashion at an individual device level at fabric edge device 108(A).

Figure 2:
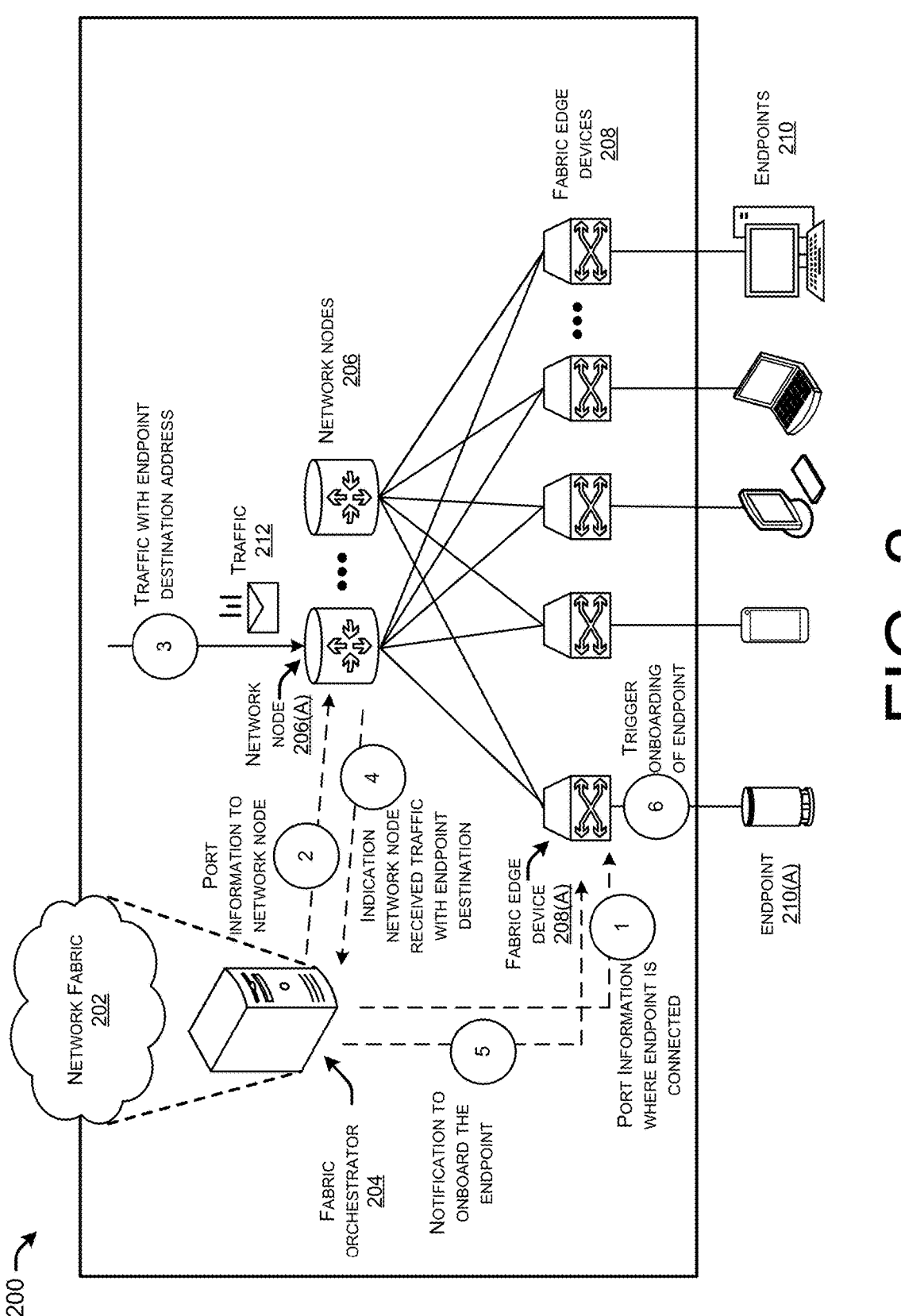
FIG. 2 illustrate a system-architecture diagram of an example environment for implementing at least some of the various technologies disclosed herein. The environment includes a software defined network where endpoint onboarding is triggered by an indication sent from a network orchestrator due to network traffic.

FIG. 2 illustrates an example environment having a SDT architecture for enhancing IPDT. Similar to the example environment 100 illustrated in FIG. 1, environment 200 includes a network fabric 202 with a centralized fabric orchestrator 204, that controls network devices such as network nodes 206 and fabric edge devices 208. Environment 200 also includes multiple endpoints 210 connected to the network fabric 202 at fabric edge devices 208.

For enhanced endpoint onboarding of an endpoint connected to the network fabric, such as endpoint 210(A) connected to network fabric 202 by fabric edge device 208(A), at (1) the fabric orchestrator 104 receives port information regarding where endpoint 210(A) is connected. For example, a network administrator may identify a port number of fabric edge device 208(A) where endpoint 210 (A) is connected.

Once the orchestrator 204 has the information regarding where the endpoint 210(A) is connected to the network fabric 202, at (2) the orchestrator 204 shares this endpoint information with other network nodes 206, such as network node 206(A) in this example, which enables data-plane inspection.

At (3), when the network node 206(A) receives traffic 212 having the destination address of endpoint 210(A), the network node 206(A) sends an indication, at (4), back to the fabric orchestrator 204, that the network node 206(A) received the traffic 212 having the destination address of endpoint 210(A).

At (5), the Fabric orchestrator 204 send to the fabric edge device 208(A) to which the endpoint 210(A) is connected, a notification to onboard the endpoint 210(A), the notification may be in unicast packet sent directly from the fabric orchestrator 204 to the appropriate fabric edge device 208 (A). Thus, at (6) the onboarding process is triggered and the fabric edge device 208(A) onboards the endpoint 210(A) into the network fabric 202.

FIG. 2 illustrates a similar endpoint device onboarding process to that depicted in FIG. 1. However, instead of the network node sending an indication directly to the fabric edge device that an event relating to the endpoint has occurred as described with reference to FIG. 1, FIG. 2 illustrates the network node device sending the indication back to the fabric orchestrator, and the fabric orchestrator instructs the fabric edge to onboard the endpoint.

Figure 3:
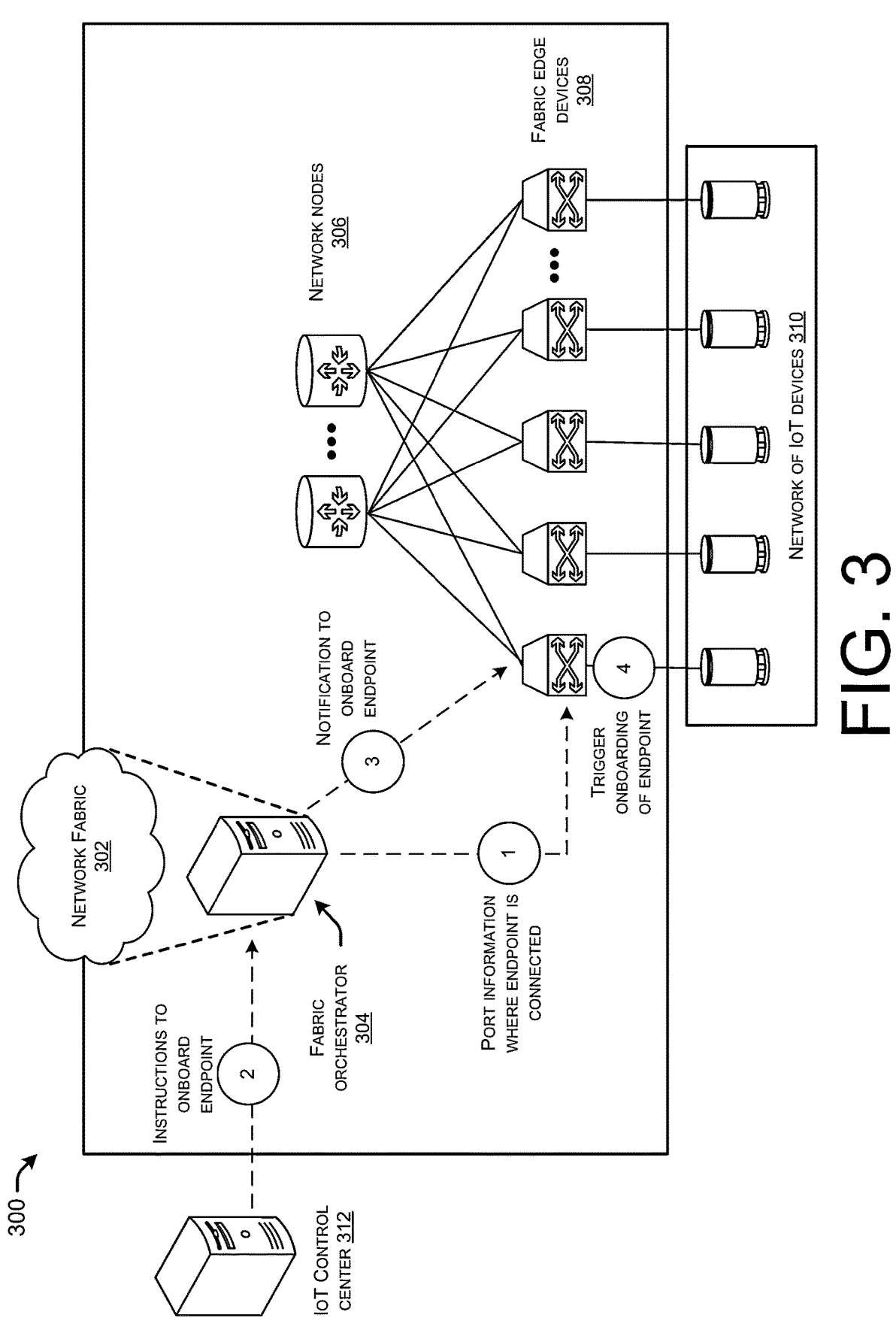
FIG. 3 illustrate a system-architecture diagram of an example environment for implementing at least some of the various technologies disclosed herein. The environment includes a software defined network where endpoint onboarding is triggered by instructions from an external control center.

FIG. 3 illustrates an example SDT architecture for enhancing IPDT where endpoint onboarding is triggered by instructions from an external control center. The environment 300 includes a network fabric 302 with a centralized fabric orchestrator 304, that controls network devices such as network nodes 306 and fabric edge devices 308. Environment 300 also includes multiple endpoints that makeup a network of IoT devices 310 connected to the network fabric 302 at fabric edge devices 308. Finally, environment 300 includes an external controller, IoT control center 312, associated with the IoT endpoints in the network of IoT devices 310. The external control center may be a proprietary system that is responsible for managing the IoT network of devices 310 of a specific endpoint type.

For enhanced endpoint onboarding of an endpoint connected to the network fabric triggered by IoT control center 312, at (1) the fabric orchestrator 304 receives port information regarding where specific endpoints in the network of IoT devices 310 are connected. For example, a network administrator may identify a port number of fabric edge device where a particular endpoint is connected. Alternately of in addition, the fabric orchestrator 304 may receive the information regarding where a particular endpoint is connected from the IoT control center 312.

At (2), fabric orchestrator 304 receives instructions to onboard endpoint(s) from the IoT control center 312. For example, IoT control center 312 may send an API call to the fabric orchestrator 304 to bring all specific endpoints of a particular type in the network of IoT devices 310 onboard. For example, after maintenance is completed on the network of IoT devices 310, IoT control center 312, that manages the network of IoT devices 310, sends an API call to the fabric orchestrator 304 to onboard endpoint devices in the network of IoT devices 310. In another example, the onboarding initiation may be based on a particular time (e.g., an onboarding schedule for the particular endpoint type), or any other predefined user trigger.

At (3), the fabric orchestrator 304 sends a notification to onboard all relevant endpoints in the network of IoT devices 310 to the fabric edge device(s) 308 to which the relevant endpoints are connected. Finally, at (4), the onboarding of relevant endpoint(s) is triggered, and the endpoints are successfully onboarded into the network fabric 302.

Figure 4:
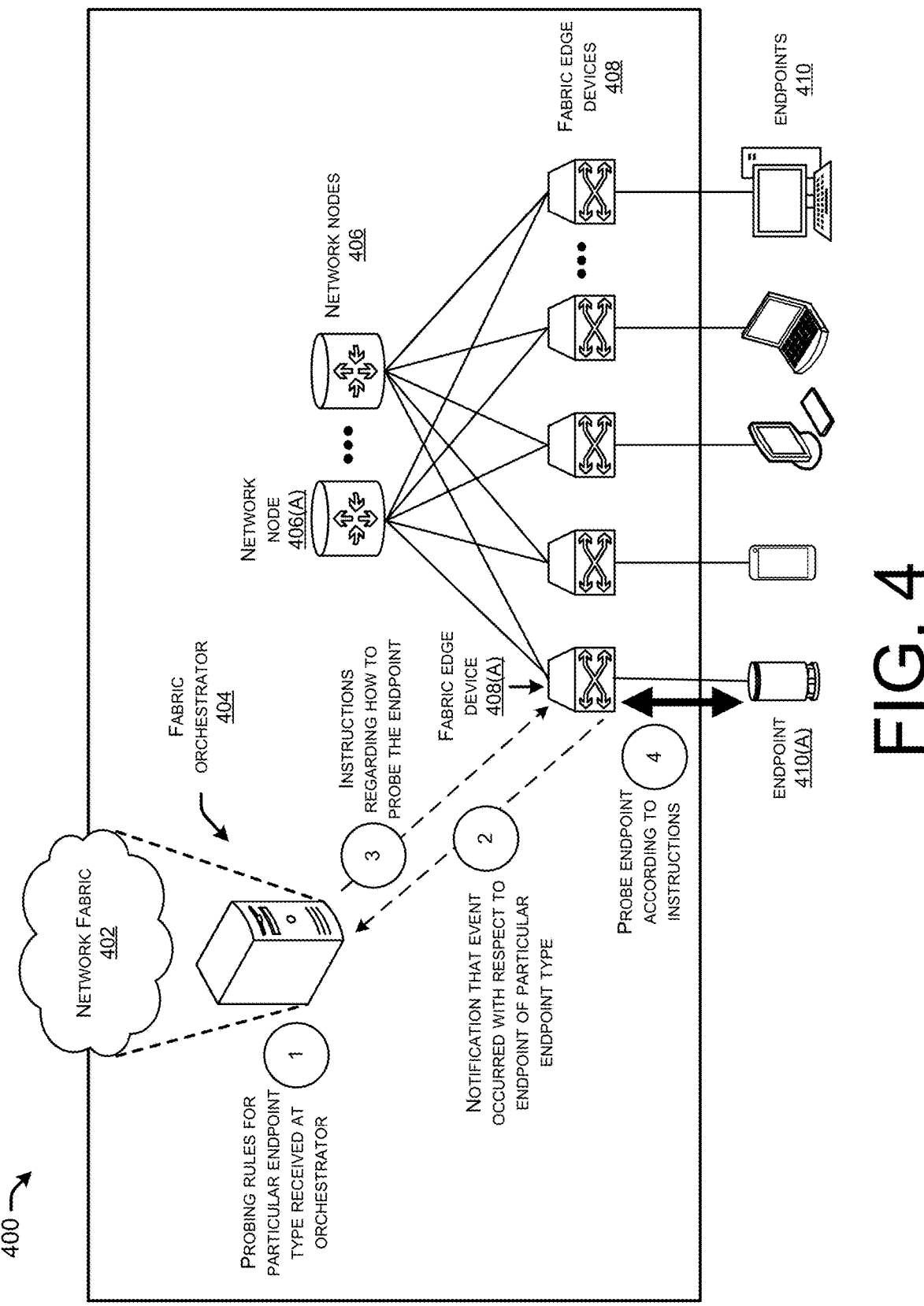
FIG. 4 illustrate a system-architecture diagram of an example environment for implementing at least some of the various technologies disclosed herein. The environment includes a software defined network where endpoint probing is enabled according to rules for a particular endpoint type.

FIG. 4 illustrates an example SDT architecture for enhancing IPDT where enhanced endpoint probing is enabled according to rules for a particular endpoint type. The environment 400 includes a network fabric 402 with a centralized fabric orchestrator 404, that controls network devices such as network nodes 406 and fabric edge devices 408. Environment 400 also includes multiple endpoints 410 connected to the network fabric 402 at fabric edge devices 408.

For enhanced endpoint probing of a particular endpoint type connected to the network fabric, such as endpoint 410(A) connected network fabric 402 at fabric edge device 408(A), at (1) the fabric orchestrator 404 receives optimal probing rules for a given class of endpoints, such as for the class of endpoints that endpoint 410(A) is a member (e.g., for BMS endpoint use DECnet packets instead of ARP packets).

At (2), the network orchestrator 404 receives a notification that an event occurred with respect to an endpoint of particular endpoint type from a network device such as fabric edge device 408(A). However, the notification may also be received from other types of network devices, such as network node 406(A). The event may be a link up event, a CDP/LLDP packet, successful classification of the endpoint on the fabric edge, etc.

Once the fabric orchestrator 404 receives the event notification, at (3) the fabric orchestrator 404 sends instructions to the fabric edge device 408(A) on how to adjust current probing logic to optimize its behavior for the given class of endpoints which endpoint 410(A) belongs to. The fabric orchestrator 404 may send the instructions via SSH, NETCONF, or API call, for example.

At (4), fabric edge device 408(A) accepts the new settings and applies them for the given endpoint 410(A) enabling optimal logic for the given endpoint class. The instructions may include a specific protocol to use, timers to be used, etc.

Figure 5:
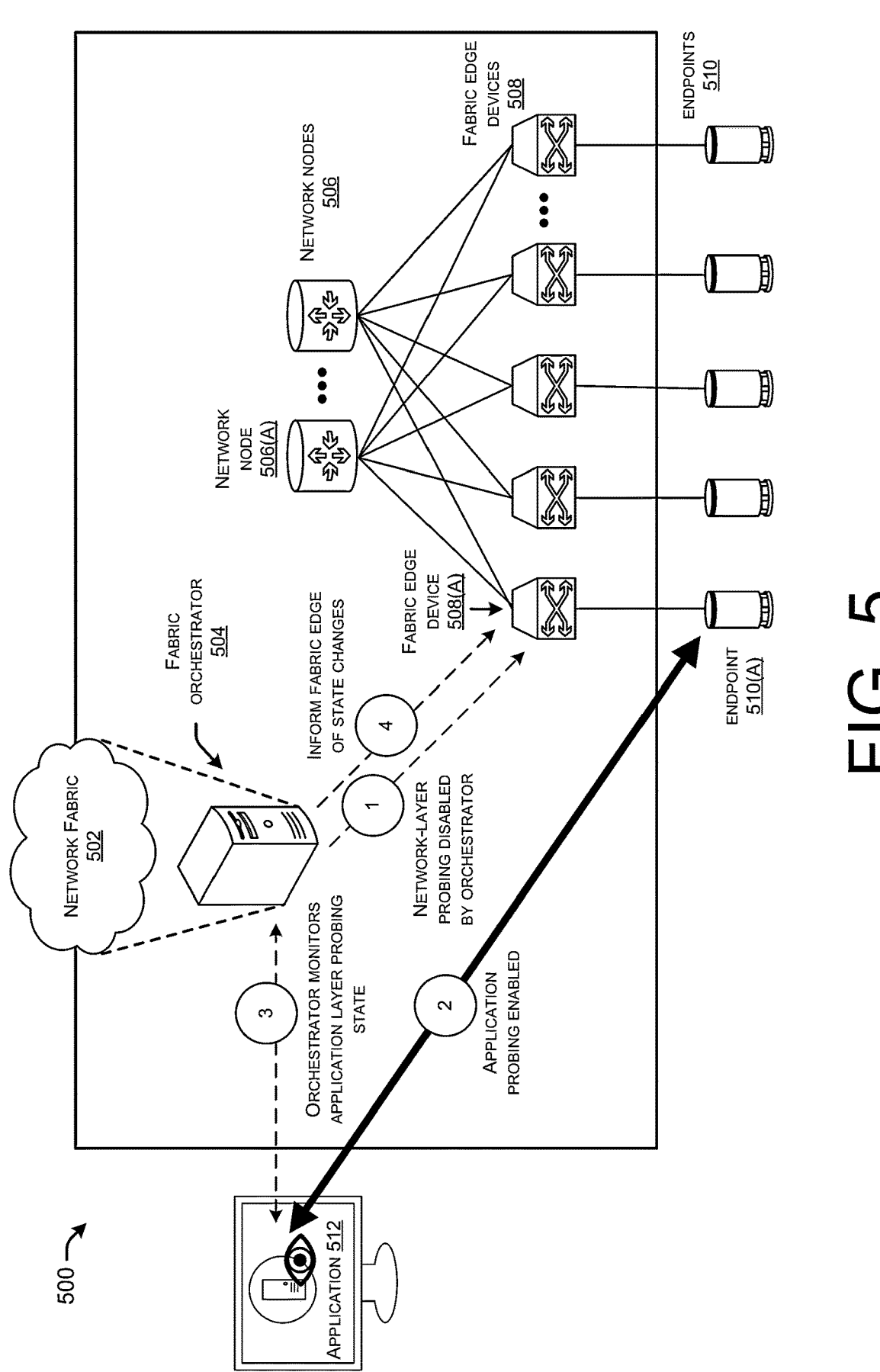
FIG. 5 illustrate a system-architecture diagram of an example environment for implementing at least some of the various technologies disclosed herein. The environment includes a software defined network where endpoint probing is enabled on the application layer.

FIG. 5 illustrates an example environment of a SDT architecture for enhancing IPDT where application layer probing is enabled. The environment 500 includes a network fabric 502 with a centralized fabric orchestrator 504, that controls network devices such as network nodes 506 and fabric edge devices 508. Environment 500 also includes multiple endpoints 510 connected to the network fabric 502 at fabric edge devices 508. Environment 500 also includes application 512 for application layer probing of the endpoints 510 for use when endpoints 510 do not comply with generic network layer probing logic applied on the fabric edge.

Enhanced application layer endpoint probing may be used when probing from fabric edge devices 508 cannot be effectively used due to very specific endpoint behaviors and limitations on the network devices. For example, a monitoring system may be used to probe an endpoint or set of endpoints of a particular type. At (1), network layer probing is disabled by the fabric orchestrator 504. The decision to disable network layer probing and switch to application layer probing may be made internally by a network administrator, or externally at network controller associate with a network of IoT devices which are connected to the network fabric 502.

At (2) application layer probing is enabled to be performed by an application 512. Once application layer probing is enabled, at (3) the fabric orchestrator 504 monitors the application layer probing state. The monitoring may be done via API to a proprietary system, or cloud, or any other appropriate means.

In case of probing state change, at (4) the fabric orchestrator 504 sends information to the fabric edge device 510(A) to change local IPDT state-machine and reflect the state accordingly.

FIG. 6 illustrates flow diagrams of example process 600 that illustrate aspects of onboarding an endpoint in a software defined network as described in FIG. 1 and FIG. 2. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 602, an orchestrator of a network fabric receives port information indicating a port of a fabric edge device to which an endpoint is connected. For example, in FIG. 1 the fabric orchestrator 104 may receive port information for fabric edge device 108(A) to which endpoint 110(A) is connected, from a network administrator. In FIG. 2 fabric orchestrator 204 may receive port information for fabric edge device 208(A) to which endpoint 210(A) is connected.

At operation 604, the orchestrator transmits the port information to a network node in the network fabric enabling data-plane traffic inspection. For example, in FIG. 1 the fabric orchestrator 104 transmits the port information to network node 106(A). In FIG. 2, the fabric orchestrator 204 transmits the port information to network node 206(A).

At operation 606, using the port information, the network node detects traffic having a destination address corresponding to the endpoint. For example, in FIG. 1 the network node 106(A) detects traffic 112 having the destination address of endpoint 110(A). In FIG. 2 network node 206(A) detects traffic 212 having the destination address of endpoint 210 (A).

At operation 608, the network node transmits an indication that traffic was received by the network node having the destination address corresponding to the endpoint. For example, in FIG. 1 network node 106(A) sends an indication to fabric edge device 108(A) that traffic 112 was received by network node 106(A). In FIG. 2 network node 206(A) sends the indication that traffic 212 was received by network node 206(A) to the fabric orchestrator 204.

At operation 610, an onboarding of the endpoint into the network fabric is triggered at the fabric edge device. For example, in FIG. 1 once the fabric edge device 108(A) receives the indication sent from network node 106(A), onboarding of endpoint 110(A) is triggered. In FIG. 2, when the fabric orchestrator 204 receives the indication from network node 206(A), the fabric orchestrator sends a notification to fabric edge device 208(A) to onboard endpoint 210(A), when fabric edge device 208(A) receives the notification, the onboarding of endpoint 210(A) is triggered.

FIG. 7 illustrates flow diagrams of example process 700 that illustrate aspects of onboarding an endpoint in a software defined network as described in FIG. 3. The logical operations described herein with respect to FIG. 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 702, an orchestrator of a network fabric receives port information indicating a port of a fabric edge device to which an endpoint is connected. For example, in FIG. 3 the fabric orchestrator 304 may receive port information for a fabric edge device 308 to which an endpoint in the network of IoT devices 310 is connected, from a network administrator.

At operation 704, the orchestrator receives instructions to onboard the endpoint from a control center associated with the endpoint. For example, in FIG. 3 the fabric orchestrator 304 receives instructions to onboard and endpoint in the network of IoT devices 310 from an IoT control center 312 that is associated with the network of IoT devices 310.

At operation 706, the orchestrator transmits a notification to the fabric edge device to onboard the endpoint into the network fabric. For example, in FIG. 3 the fabric orchestrator 304 sends a notification to onboard and endpoint device in the network of IoT devices 310 to a fabric edge device 308 to which the endpoint device in the network of IoT devices 310 is connected.

At operation 708, an onboarding of the endpoint into the network fabric is triggered at the fabric edge device. For example, as shown is FIG. 3 at (4) onboarding of an endpoint in the network of IoT devices 310 into the network fabric 302 is triggered.

FIG. 8 illustrates flow diagrams of example process 800 that illustrate aspects of onboarding an endpoint in a software defined network as described in FIG. 4. The logical operations described herein with respect to FIG. 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 8 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 802, an orchestrator of a network fabric receives probing rules associated with a particular endpoint type. For example, in FIG. 4 a fabric orchestrator 404 receives probing rules for a particular endpoint type (e.g., endpoint 410(A)). The probing rules may include, but are not limited to, a protocol to be used, a probing schedule pertaining to endpoints of the particular endpoint type, with instructions to probe endpoints of the particular endpoint type at a predetermined time, and/or at predetermined time intervals.

At operation 804, the orchestrator receives, from a fabric edge device, a notification that an event occurred with respect to an endpoint connected to the fabric edge device, the notification indicating that the endpoint is of the particular endpoint type. For example, in FIG. 4 the fabric orchestrator 404 receives a notification indicating that an event occurred with respect to endpoint 410(A) connected to fabric edge device 408(A), and that endpoint 410(A) is of the particular endpoint type.

At operation 806, based at least in part on the endpoint being of the particular endpoint type, the orchestrator transmits instructions to the fabric edge device, based at least in part on the probing rules, regarding how to probe the endpoint. For example, in FIG. 4 the fabric orchestrator 404 transmits instruction to the fabric edge device 408(A) regarding how to probe the endpoint 410(A).

Figure 9:
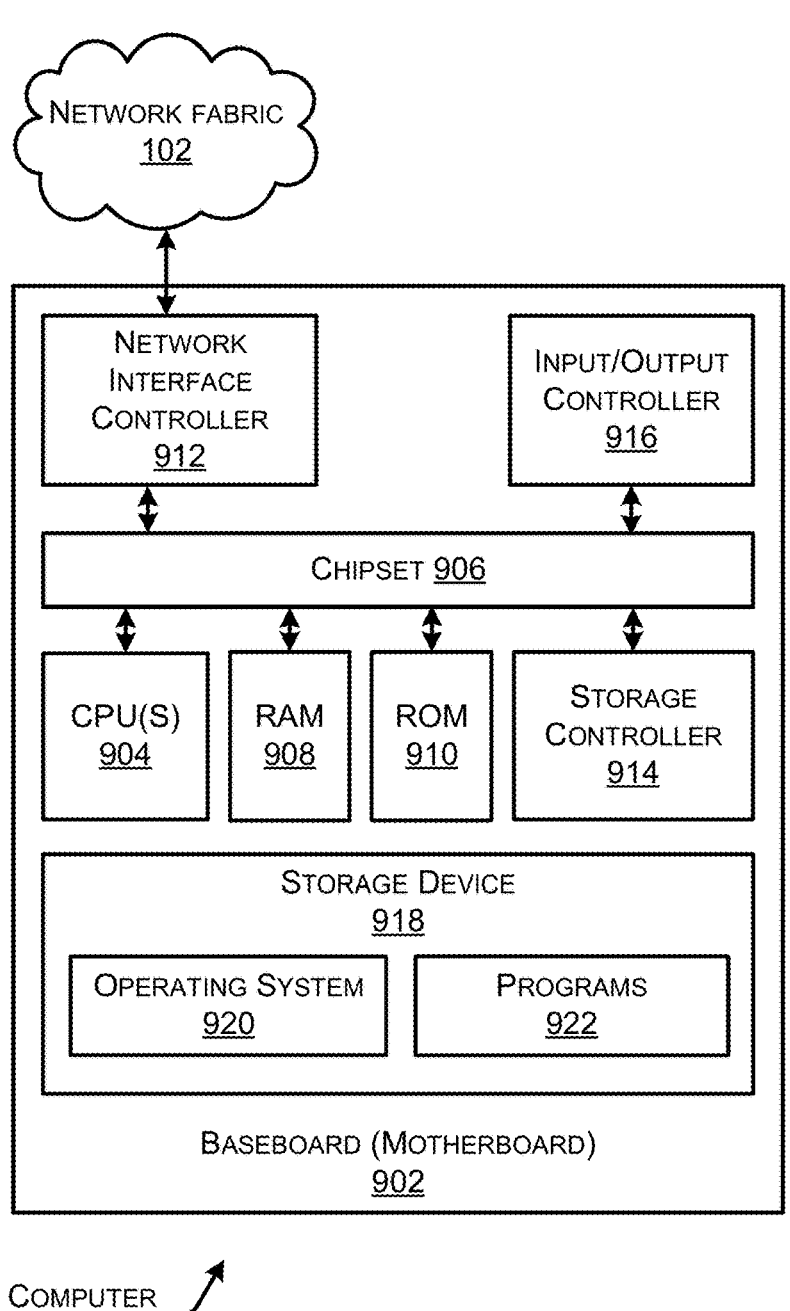
FIG. 9 illustrates a computer architecture diagram showing an example computer hardware architecture for implementing a network device that can be utilized to implement aspects of the various technologies presented herein.

FIG. 9 shows an example computer architecture for a computer 900 capable of executing program components for implementing the functionality described herein. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to any of the servers, routers, or devices discussed herein. In some embodiments, computer 900 may include networked devices such as servers, switches, routers, hubs, bridges, gateways, modems, repeaters, access points, firewalls etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network fabric 102. The chipset 906 can include functionality for providing network connectivity through a Network Interface Controller (NIC) 912, such as a gigabit Ethernet adapter. The NIC 912 is capable of connecting the computer 900 to other computing devices over the network fabric 102. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by devices described herein, and or any components included therein, may be supported by one or more devices similar to computer 900. Stated otherwise, some or all of the operations performed by the fabric orchestrator 104, the network nodes 106, the fabric edge devices 108, and or any components included therein, may be performed by one or more computer devices 900 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described herein. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of a router, a border router, a switch, and/or a server. The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at an orchestrator of a network fabric, probing rules associated with a particular endpoint type, wherein the probing rules include events that trigger a deregistration of the particular endpoint type;

receiving, at the orchestrator and from a fabric edge device, a notification that an event occurred with respect to an endpoint connected to the fabric edge device, the notification indicating that the endpoint is of the particular endpoint type; and based at least in part on the endpoint being of the particular endpoint type, transmitting, from the orchestrator and to the fabric edge device, instructions, based at least in part on the probing rules, regarding how to probe the endpoint.

2. The method of claim 1, further comprising probing, by the fabric edge device, the endpoint according to the instructions.

3. The method of claim 1, wherein the probing rules indicate a specific type of communication protocol to use to communicate with the endpoint.

4. The method of claim 1, wherein the probing rules include a probing schedule pertaining to endpoints of the particular endpoint type, and the probing schedule includes instructions to probe endpoints of the particular endpoint type at a predetermined time.

5. The method of claim 1, wherein the instructions are transmitted using Secure Shell (SSH) protocol, Network Configuration Protocol (NETCONF), or Push Application Programming Interface (API).

6. The method of claim 1, further comprising receiving, at the orchestrator, the probing rules associated with the particular endpoint type from a control center associated with the particular endpoint type.

7. The method of claim 6, wherein the endpoint is an internet of things (IoT) device, and the control center is an operational technology (OT) control center responsible for managing an IoT network to which the endpoint belongs.

8. A system comprising:

one or more processors; and one or more computer-readable media storing computer-executable instructions that, when executed by the one or more processors, cause the one or more processors to perform operations comprising:

receiving, at an orchestrator of a network fabric, probing rules associated with a particular endpoint type, wherein the probing rules include events that trigger a deregistration of the particular endpoint type;

receiving, at the orchestrator and from a fabric edge device, a notification that an event occurred with respect to an endpoint connected to the fabric edge device, the notification indicating that the endpoint is of the particular endpoint type; and based at least in part on the endpoint being of the particular endpoint type, transmitting, from the orchestrator and to the fabric edge device, instructions, based at least in part on the probing rules, regarding how to probe the endpoint.

9. The system of claim 8, the operations further comprising probing, by the fabric edge device, the endpoint according to the instructions.

10. The system of claim 8, wherein the probing rules indicate a specific type of communication protocol to use to communicate with the endpoint.

11. The system of claim 8, wherein the probing rules include a probing schedule pertaining to endpoints of the particular endpoint type, and the probing schedule includes instructions to probe endpoints of the particular endpoint type at a predetermined time.

12. The system of claim 8, the operations further comprising receiving, at the orchestrator, the probing rules associated with the particular endpoint type from a control center associated with the particular endpoint type.

13. The system of claim 12, wherein the endpoint is an internet of things (IoT) device, and the control center is an operation technology (OT) control center responsible for managing an IoT network to which the endpoint belongs.

14. One or more non-transitory computer-readable media storing instructions that, when executed, cause one or more processors to perform operations comprising:

receiving, at an orchestrator of a network fabric, probing rules associated with a particular endpoint type, wherein the probing rules include events that trigger a deregistration of the particular endpoint type;

receiving, at the orchestrator and from a fabric edge device, a notification that an event occurred with respect to an endpoint connected to the fabric edge device, the notification indicating that the endpoint is of the particular endpoint type; and based at least in part on the endpoint being of the particular endpoint type, transmitting, from the orchestrator and to the fabric edge device, instructions, based at least in part on the probing rules, regarding how to probe the endpoint.

15. The one or more non-transitory computer-readable media of claim 14, the operations further comprising probing, by the fabric edge device, the endpoint according to the instructions.

16. The one or more non-transitory computer-readable media of claim 14, wherein the probing rules indicate a specific type of communication protocol to use to communicate with the endpoint.

17. The one or more non-transitory computer-readable media of claim 14, wherein the probing rules include a probing schedule pertaining to endpoints of the particular endpoint type, and the probing schedule includes instructions to probe endpoints of the particular endpoint type at a predetermined time.

18. The one or more non-transitory computer-readable media of claim 14, the operations further comprising receiving, at the orchestrator, the probing rules associated with the particular endpoint type from a control center associated with the particular endpoint type.

19. The one or more non-transitory computer-readable media of claim 18, wherein the endpoint is an internet of things (IoT) device, and the control center is an operational technology (OT) control center responsible for managing as IoT network to which the endpoint belongs.

20. The one or more non-transitory computer-readable media of claim 14, wherein the instructions are transmitted using Secure Shell (SSH), Network Configuration Protocol (NETCONF), or Push Application Programming Interface (API).

* * * * *